J. M. WELCH.
ADJUSTABLE MEASURING SCOOP.
APPLICATION FILED FEB. 1, 1912.
1,050,502.
Patented Jan. 14, 1913.
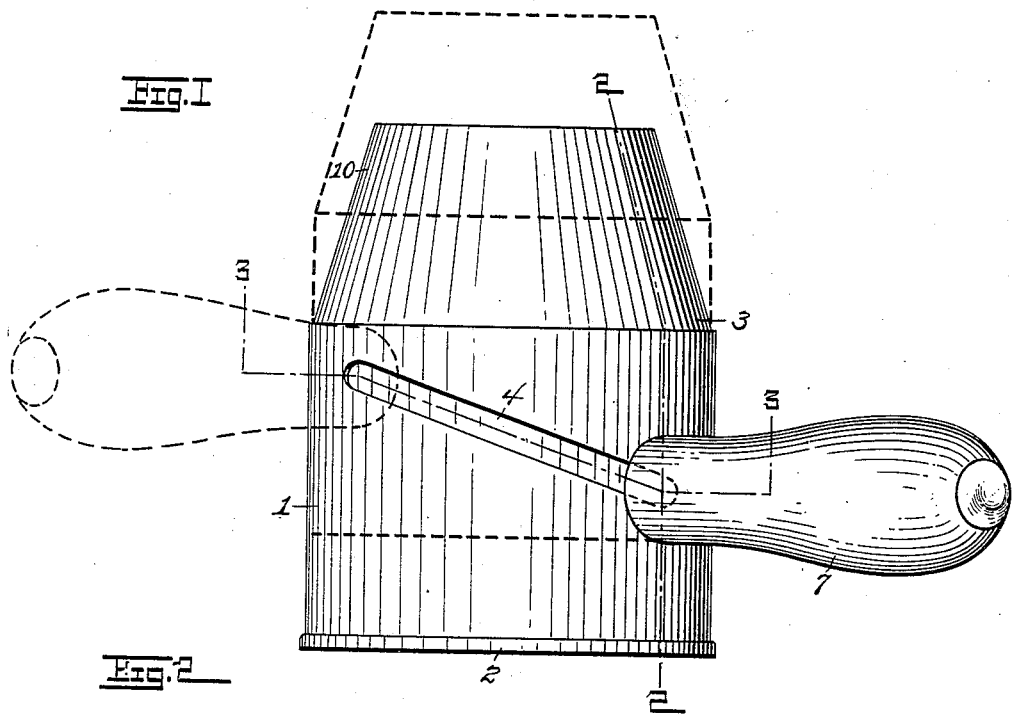
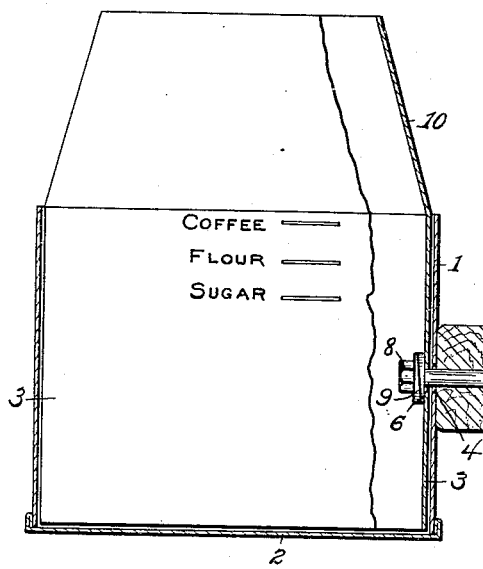
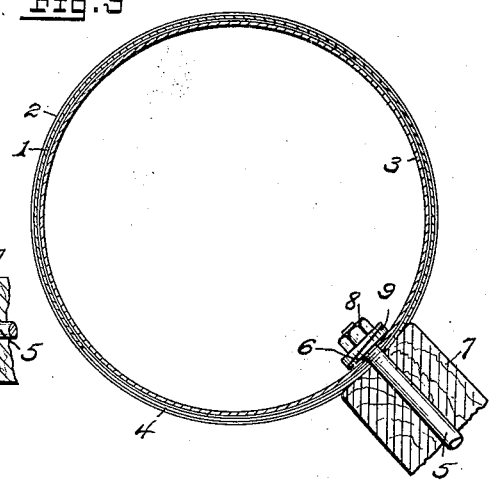
WITNESSES:
INVENTOR
James M. Welch
BY
ATTORNEY

UNITED STATES PATENT OFFICE.

JAMES M. WELCH, OF SHEPHERDSTOWN, OHIO.

ADJUSTABLE MEASURING-SCOOP.

1,050,502. Specification of Letters Patent. Patented Jan. 14, 1913.

Application filed February 1, 1912. Serial No. 674,660.

*To all whom it may concern:*

Be it known that I, JAMES M. WELCH, a citizen of the United States of America, and resident of Shepherdstown, county of Belmont, and State of Ohio, have invented certain new and useful Improvements in Adjustable Measuring-Scoops, of which the following is a specification.

This invention relates broadly to measuring scoops, and specifically to a device designed primarily for grocers' use and adapted for dispensing sugar, coffee, rice or other dry groceries sold in bulk; and it has for its primary object to provide a scoop or dipper which is adapted to be readily adjusted to increase or diminish its capacity for accurately measuring materials of various kinds.

A further object is to provide a scoop which may be so accurately adjusted to fix its capacity for measuring a certain quantity of material that the necessity of the user's returning from the weighing scales to the main receptacle or container for a slight additional quantity, or for putting back a slight excess quantity, is practically obviated.

Another object of the invention is to provide a measuring vessel having telescoping parts provided with novel means of adjustment which admit of movement of said parts any desired distance with respect to each other without the danger of instantaneous transference to the limit of the telescoping movement.

It is well known that telescoping members frequently assume binding relation, and where a stud or like element carried by one member operates in a slot provided in the other in alinement with the direction of movement of said members, considerable force is oftentimes required to start movement of one member with respect to the other; and, once started, the movement is practically instantaneous, resulting in the applied force carrying said members past the desired point of adjustment, if not to the extreme limit of possible adjustment.

As before indicated, it is a purpose of the present invention to obviate the recited objection of employing an adjustment in which a slot in alinement with the direction of telescoping movement is provided.

Another object of the invention is to provide a vessel composed of telescoping sections and provided with a guideway or guide-slot which, throughout all degrees of adjustment of said sections, is maintained closed against the passage of dry material therethrough without the employment of a third part or element designed for such purpose.

A still further object within the contemplation of this invention is to provide a measuring device whose mouth is so formed that the material measured therein may be readily leveled without the employment of a straight-edge or other leveling tool, and also that its insertion within the mouth of a paper bag for emptying the contents may be readily accomplished.

With these and other objects in view, the invention finally resides in the features of construction, arrangement of parts and combinations of elements which will hereinafter be exemplified, reference being had to the accompanying drawings, forming a part of this specification, in which—

Figure 1 is a side elevation of the invention; Fig. 2 is a partial vertical section on the line 2—2, Fig. 1; and Fig. 3 is a cross section on the line 3—3, Fig. 1.

Referring to said drawings, in which like designating characters distinguish like parts throughout the several views—1 indicates an outer cylindrical casing having a fixed bottom 2. An inner cylindrical casing 3 is fitted snugly within the casing 1 and is adapted to telescope with relation to the latter for changing the capacity of the vessel of which said casings form complemental parts or sections.

Provided in the outer casing 1 is a diagonally extending slot 4 through which is directed a bolt 5 having its end projected through an aperture 6 provided therefor in the inner casing 3. Said bolt is preferably fixed in a handle 7 so that turning movement of the latter will produce a corresponding movement in the bolt. Said bolt has its end threaded, and a nut 8 is received thereon whereby, when said bolt is turned, the nut and the handle are caused to approach each other for exerting a binding pressure against the interposed sections, or to separate for releasing such pressure, according to the direction of the turning movement. A split spring washer 9 is preferably interposed between the nut and the casing 3 for preventing such retraction of the nut when the binding pressure is released as will allow the nut to turn with the bolt when it is desired to renew the binding pressure.

While the clamping means just described is deemed preferable, it will be obvious that other means or devices for clamping in adjusted relation the casings constituting the receptacle may be employed, such for instance, as a fixed head provided on the inner end of the bolt, with a handle threaded upon the body of the bolt whereby, by turning the handle with respect to the bolt, the head and handle will move to and from impinging relation with the casings.

The aperture 6 in the inner casing is so spaced with respect to the top and bottom edges of the latter and with respect to the location of the slot 4 in the outer casing that the extreme limits of adjustment of said casings permitted by the length of the slot may be accomplished without uncovering the latter, thus insuring against leakage of the contents through the slot.

To adjust the device to a desired capacity, the binding pressure maintained on the casings is released, as by rotating the handle rearward; then, grasping the outer casing firmly in one hand and the handle in the other, the handle is moved up or down, as may be required, along the inclined slot, which action serves to gradually elevate or lower the inner casing with respect to the outer casing for increasing or decreasing the capacity of the vessel. The desired point of adjustment being reached, the handle is rotated forward until a binding pressure is exerted for maintaining the casings in adjusted relation.

For the double purpose of providing a mouth which may be readily introduced within the mouth of a paper bag in emptying the contents of the vessel and which admits of leveling of the vessel's contents without the use of a straightedge or leveling tool, the upper part of the casing 3 is made in tapered form, as shown at 10. As is obvious, a slight sidewise shaking movement of the vessel, imparted by the hand which holds the handle 7, suffices to remove such of the vessel's contents as is heaped above the level of the contracted mouth; but, owing to the form of said mouth, such movement will not shake from the vessel the contents below such level to the same extent as in a vessel whose mouth is not so contracted.

Having thus described my invention, what I claim as new, and desire to secure by Letters Patent, is—

1. A measuring scoop comprising an outer cylindrical casing having a bottom and provided with a diagonally extending guide-slot in its side, an inner cylindrical casing telescoping within said outer casing and adapted to maintain said slot closed throughout the entire range of its telescopic adjustment, said inner casing having an aperture therein, a handle having a threaded bolt fixed thereto and alined axially therewith and projected through the slot in the outer casing and the aperture in the inner casing, and a nut on the end of said bolt whereby when said handle is turned clamping of said casings in adjusted relation is effected.

2. A measuring scoop comprising separable telescoping casings, the outer casing having a bottom and provided with a diagonally inclined guide-slot in its side, the inner casing being adapted to maintain said slot closed throughout the entire range of its telescopic adjustment, and means for clamping said casings in adjusted relation, said means comprising a bolt movable along said slot and projected through the inner casing, a handle of greater diameter than said bolt fixed on the outer end thereof and alined axially therewith, and a threaded element on the inner end of said bolt, said handle and said element being adapted to coöperate when the former is rotated forward to impinge respectively on the outer face of the outer casing and the inner face of the inner casing.

3. A measuring scoop comprising a vessel composed of telescopic casings one of which has a bottom fixed thereto, a tapered upper end formed on the other of said casings, the outer of said casings having a diagonally inclined slot therein, a handle having a reduced threaded axially alined end directed through the wall of the inner casing and movable along the slot in the outer casing, and a threaded element within the inner casing upon the threaded end of the handle whereby turning movement of the latter effects the clamping of the casings in adjusted position between said element and the adjacent end of the unreduced portion of the handle.

In testimony whereof I affix my signature in presence of two subscribing witnesses.

JAMES M. WELCH.

Witnesses:
W. M. WELCH,
L. D. MORRIS.